(12) United States Patent
Lewandowski

(10) Patent No.: US 11,313,964 B2
(45) Date of Patent: Apr. 26, 2022

(54) METHODS FOR OPERATING A SENSOR ARRANGEMENT ON THE BASIS OF A DSI PROTOCOL IN A MOTOR VEHICLE AND ALSO A CORRESPONDING SENSOR ARRANGEMENT IN A MOTOR VEHICLE

(71) Applicant: Valeo Schalter und Sensoren GmbH, Bietigheim-Bissingen (DE)

(72) Inventor: Marek Lewandowski, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 475 days.

(21) Appl. No.: 16/486,242

(22) PCT Filed: Feb. 15, 2018

(86) PCT No.: PCT/EP2018/053758
§ 371 (c)(1),
(2) Date: Aug. 15, 2019

(87) PCT Pub. No.: WO2018/149908
PCT Pub. Date: Aug. 23, 2018

(65) Prior Publication Data
US 2020/0241130 A1    Jul. 30, 2020

(30) Foreign Application Priority Data
Feb. 16, 2017 (DE) .......................... 102017103117.0

(51) Int. Cl.
*G01S 13/931* (2020.01)
*H04L 12/40* (2006.01)
*G06V 20/56* (2022.01)

(52) U.S. Cl.
CPC ............ *G01S 13/931* (2013.01); *G06V 20/56* (2022.01); *H04L 12/40013* (2013.01); *G01S 2013/93275* (2020.01); *H04L 2012/40273* (2013.01)

(58) Field of Classification Search
CPC ......... G01S 13/931; G01S 2013/93275; H04L 12/40013; H04L 2012/40273; G08C 19/00; G06K 9/00791
See application file for complete search history.

(56) References Cited

U.S. PATENT DOCUMENTS

2011/0093739 A1* 4/2011 Bernon-Enjalbert ........................ H04L 25/028
714/4.5
2011/0121858 A1   5/2011 Cassagnes et al.
(Continued)

FOREIGN PATENT DOCUMENTS

DE    102008057065 A1    5/2009
DE    102012222891 A1    6/2014

OTHER PUBLICATIONS

International Search Report and Written Opinion in corresponding International Applicaiton No. PCT/EP2018/053758, dated May 28, 2019 (10 pages).
German Search Report in corresponding German Application No. 10 2017 103 117.0, dated Nov. 24, 2017 (5 pages).

*Primary Examiner* — Timothy A Brainard
(74) *Attorney, Agent, or Firm* — Osha Bergman Watanabe & Burton LLP

(57) ABSTRACT

The DSI protocol (distributed system interface) that relates to the bus communication in sensor arrangements is known from the prior art.
Methods are proposed for operating a sensor arrangement (12) on the basis of the DSI protocol in order to consequently be able to operate, in particular in an advantageous manner, active sensor units (20A-20F) having a transmitter (Continued)

(21) and a receiver (22). In particular, the use of three part phases is proposed for the communication between the processing unit (14) and the active sensor unit (20A-20F), namely a CRM phase (40) for the bidirectional communication between the processing unit (14) and the active sensor unit (20A-20F), a power phase (43) for the transmission of energy from the processing unit (14) to the active sensor units (20A-20F) and a PDCM phase for the unidirectional transmission of data from the active sensor unit (20A-20F) to the processing unit (14). Furthermore, it is proposed in a CRM phase (40) to grant at least one active sensor unit (20A-20F) the release for a supplementary time slot (47G, 47H) in the PDCM phase (44) with the result that this active sensor unit (20A-20F) in the PDCM phase has two time slots (47A-47H) available for the communication with the processing unit (14).

14 Claims, 4 Drawing Sheets

(56) References Cited

U.S. PATENT DOCUMENTS

| 2011/0208886 | A1* | 8/2011 | Sugiura | H04L 12/403 |
| | | | | 710/110 |
| 2013/0070863 | A1 | 3/2013 | Ohl | |
| 2016/0109489 | A1 | 4/2016 | Krishna et al. | |
| 2018/0146907 | A1* | 5/2018 | Nishiyama | A63B 71/0622 |

* cited by examiner

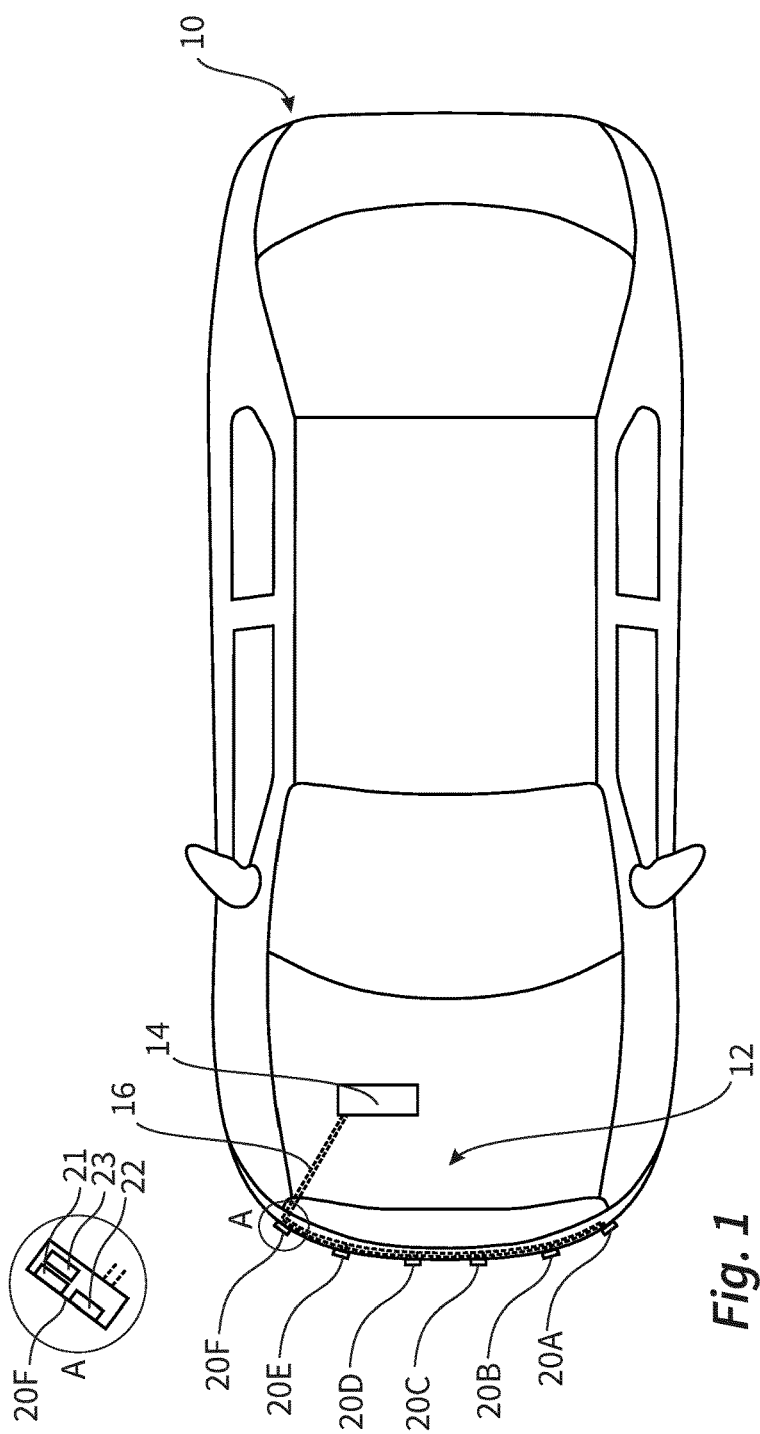
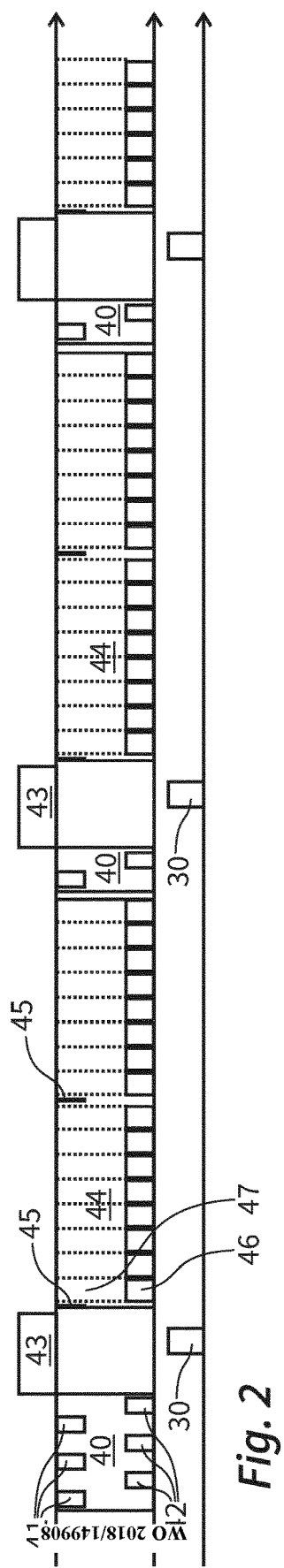
Fig. 1
Fig. 2

METHODS FOR OPERATING A SENSOR ARRANGEMENT ON THE BASIS OF A DSI PROTOCOL IN A MOTOR VEHICLE AND ALSO A CORRESPONDING SENSOR ARRANGEMENT IN A MOTOR VEHICLE

FIELD OF APPLICATION AND PRIOR ART

The invention relates to methods for operating a sensor arrangement on the basis of a DSI protocol in a motor vehicle and also a sensor arrangement in a motor vehicle, said sensor arrangement being operated by means of a method in accordance with the invention.

The DSI protocol (distributed system interface, cf. DSI3 bus standard, revision 1.00 dated 16 Feb. 2011), the specification of which consequently by means of being explicitly mentioned herein becomes part of this disclosure of this invention, is a protocol that allows the construction of a sensor network on the basis of a particularly simple two-wire cabling arrangement in which a central instance (master) communicates with one or multiple satellite instances (slaves) via a bus. In this case, the DSI protocol focusses primarily on use in the vehicle in order by means of the central instance to query and/or to actuate a plurality of satellite instances, in particular sensors and actuators.

The specification of the DSI protocol in this case provides that such a sensor arrangement comprising at least one central instance and at least one satellite instance may be operated in one of two operating classes, on the one hand the "signal function class" and on the other hand the "power function class".

The protocol furthermore fundamentally provides three different types of use of the bus between the central instance and the satellite instance:

In the CRM mode (command and response mode) bidirectional communication takes place between the central instance and the satellite instance. The central instance transmits a command to which the satellite instance responds. This is used by way of example in order to configure satellite instances or in order to specifically query specific values from a satellite instance.

In the PDCM mode (periodic data collection mode), the satellite instances transmit comparatively large quantities of data within a predetermined time slot to the central instance, wherein the transmitting activity of the central instance is limited to providing by means of a synchronizing signal (broadcast read command) to the satellite instances a reference point for determining this time slot. The satellite instances have already been previously provided with information regarding their respective time slot with the result that said satellite instances may determine their respective transmission time interval in reaction to the synchronizing signal and on the basis thereof may transmit their sensor data to the central instance.

The transmission of comparatively large quantities of electrical energy takes place in the power phase in order to supply the satellite instances that have a high energy requirement with this energy.

The "signal function class" mentioned in the introduction in accordance with the above-mentioned specification is used primarily to connect sensor satellite instances having a lower energy requirement and a comparatively large data volume that is to be transmitted from the satellite instance to the central instance. After a sensor arrangement has been brought into the "signal function class" operation, initially a phase of the communication takes place in the CRM mode between the central instance and the satellite instance during which the satellite instance is typically configured by way of example with regard to the parameters of the above-mentioned PDCM time slot of this satellite instance. If this phase is concluded, the sensor arrangement thus switches into the PDCM mode in which the sensor satellite instance or the sensor satellite instances always transmit the ascertained data in the respectively allocated time slot to the central instance in reaction to the synchronizing signal of the central instance. This phase in the PDCM mode is typically no longer left until the operation of the sensor arrangement is interrupted. A power phase is not provided in accordance with the "signal function class" and is also not required owing to the mentioned low energy requirement.

The mentioned "power function class" is primarily used to connect actuator satellite instances having a comparatively high energy requirement and comparatively small data volume, which the central instance is to transmit to the satellite instance. During the operation of a sensor arrangement in the "power function class", phases of the communication between the central instance and the satellite instance take place in an alternating manner in the CRM mode and also power phases. In this case, the power phases are clearly predominant in terms of time. It is possible in particular to operate actuators by means of supplying the satellite instances in these phases with a comparatively large quantity of energy in the case of a higher voltage compared to the CRM mode, wherein this is typically performed on the basis of control commands that are transmitted beforehand in the CRM phase by the central instance to the satellite instance. The PDCM mode in accordance with the "power function class" is not applied since said PDCM mode is also not required in the case of the mentioned actuators owing to the small volume of data.

The DSI3 specifications therefore determine with the "signal function class" and the "power function class" two possibilities for the operation of the sensor arrangement that on the one hand are well suited to the operation of sensors having a low energy requirement and a large data volume and on the other hand are well suited for the operation of actuators having a high energy requirement and a small data volume.

A mixed operation of "signal function class" satellite instances and "power function class" satellite instances is possible in accordance with the mentioned specification if the bus is operated as a "power function class" bus and the "signal function class" satellite instances are designed in such a manner that they withstand the increased voltage in the mentioned power phase without becoming damaged.

However, it is difficult on the basis of these two function classes to render possible the operation of active sensor units, which include in particular satellite instances having sensors that sense the area surrounding a vehicle on the basis of a signal, or the echo of said signal, which is actively generated by the satellite instance.

A further disadvantage of the DSI3 standard in accordance with the mentioned specification occurs in the case of sensor arrangements whose sensors occasionally must ascertain and relay different quantities of data to the central instance. Although the DSI3 standard renders this possible, the quantity of data that is available for the transmission of data to the central instance is to be flexibly determined in the PDCM mode. However, in order to dynamically render this possible during operation, the central instance must initially newly determine the time slots for the satellite instances in the CRM mode. The quantity of data that is required for this is comparatively large and must be distributed in response to multiple commands from the central instance with the result that the quantity of data that may be transmitted from the satellite instances to the central instance accordingly decreases.

DE 102012222891 A1 discloses the use of a driver assist system having a DSI bus, and in this context the use of ultrasonic sensors.

OBJECT AND SOLUTION

The object of the invention is to provide a method for operating a sensor arrangement in a vehicle on the basis of a DSI protocol, which mitigates the disadvantages of the inadequate support of active sensors and variable quantities of data.

In accordance with the invention, this is performed in accordance with a first aspect of the invention by means of the following method that is applied in a sensor arrangement that comprises at least one processing unit (as a master/central unit) and at least one active sensor unit (as a slave/satellite unit) that are connected to one another via a bus of two lines. The active sensor unit may in particular be embodied as an ultrasonic sensor unit having a transmitter and receiver.

In accordance with the method, the communication between the processing unit and the active sensor units or the at least one active sensor unit occurs using a repeating sequence of three phases, wherein the specific order is not crucial.

In a first phase, the processing unit and the active sensor unit communicate in a bidirectional manner in the CRM mode. In this phase therefore simple or repeated commands are transmitted from the processing unit to one or multiple active sensor units, wherein these commands in particular are used for the purpose of supplying the active sensor units with parameters of a pending measuring cycle. In particular the command to transmit a signal (Tx-signal) is associated with said procedure for providing the active sensor units with parameters of a pending measuring cycle and the echo (Rx-signal) of the signal that is transmitted is subsequently sensed.

In a second phase, the active sensor units are supplied with energy. In this phase, data is not transmitted but rather in the case of an increased bus voltage any energy is transmitted to the active sensor units that require this energy for the operation and in particular to transmit the signal and the echo of said signal is subsequently to be sensed. This energy is preferably buffered in part in the active sensor units with the result that sufficient energy is available until the following energy supply phase.

In the case of a sensor arrangement having ultrasonic sensors or other active sensors that only require large quantities of energy in phases, it is advantageous if these phases of high requirement of energy overlap at least in part with the phase of supplying the energy. In the case of ultrasonic sensor units or other active sensors having a transmitter and a receiver, it is in particular advantageous if the transmission of the ultrasonic pulse or an electromagnetic pulse takes place during the phase of the energy supply with the result that it is not necessary beforehand to buffer the energy that is required for this purpose in the active sensor unit.

In a third phase, the active sensor unit transmits the sensor data in the PDCM mode to the processing unit. In this case, this is a unidirectional transmission of data. The processing unit only transmits a synchronizing signal that is used as a reference, the active sensor unit or the active sensor units therefore subsequently transmit their respective data in time slots that have been respectively previously determined. In this case, it is possible in this phase depending upon the quantity of data to also provide a repeated transmission of the synchronizing signal by means of the processing unit with the result that the active sensor units transmit the respective data distributed to multiple time slots.

As already mentioned in the introduction, in the case of this method in accordance with the first aspect of the invention likewise also in the case of the method in accordance with the second aspect of the invention explained below, the method is based on the DSI standard. This means that the mentioned data transmission phases in the CRM mode and in the PDCM mode and also the energy transmission phase preferably entirely or in part fulfil the following parameters according to the mentioned DSI specification.

Accordingly, a data transmission mode is perceived as the PDCM mode in which an essentially unidirectional transmission of data from the active sensor unit or the active sensor units to the processing unit takes place. The transmitting activity of the active sensor unit in this case conforms to a previously conveyed allocation of time slots and also a synchronizing signal of the processing unit of one to three bit length as a time reference. The procedure is performed in the PDCM phase, starting with the synchronizing signal of the processing unit and subsequently with the transmission of data from the active sensor units to the processing unit typically on multiple occasions one after the other.

A data transmission mode is perceived to be the CRM mode in which the processing unit transmits to the bus a global command or a command that is addressed usually with reference to the bus identification procedure for an active sensor unit and the active sensor unit that is where applicable consequently addressed responds with a response that is dependent upon the content of the command. In this case, it is preferred that according to the DSI specification both the command as well as the response are respectively 32 bits long.

The data is transmitted from the processing unit to the active sensor unit in the CRM mode and in the PDCM mode in accordance with the DSI specification by means of voltage modulation of the bus voltage. In this case, two voltages $V_{Low}$ of 2 V (+/−0.25 V) and $V_{High}$ of 4 V (+/−0.5 V) and also Manchester coding are used for data transmission. A transmission speed of 8 µsec/Bit is preferably provided.

The data is transmitted in the direction of the active sensor units to the processing unit in the CRM mode and in the PDCM mode in accordance with the DSI specification by means of current strength modulation, wherein the current strength switches between three levels in order to render possible three possible states in lieu of a bit having two possible states. This information unit that may assume three values is referred to as a "chip". It is preferred that a transmission speed between 2.7 µsec/Chip and 10 µsec/Chip is provided.

A voltage that is above $V_{High}$ is used in the energy transmission phase, said voltage being referred to in the specification as $V_{idle}$ and in accordance with the specification may amount to maximum 25 V. In the present example, the transmission of energy preferably takes place at least with a voltage of 6 V so that the active sensor units may differentiate this from $V_{High}$.

The above-described first aspect of the invention provides that, in a deviation from the DSI standard and in particular in order to connect active sensors, the communication between the processing unit and the active sensor units includes both a phase of rapid data transmission (PDCM phase) as well as a phase of supplying energy (power phase). As a consequence, the two features of the "signal function class" and the "power function class" mentioned in the introduction combine in a common operating mode.

As a consequence, the connection of the active sensors to a separate current supply, which is otherwise required, is omitted and a particularly simple and cost-effective cabling arrangement may be used.

Despite the change of the bus communication contrary to the DSI3 standard, the compatibility remains. When the operating parameters are selected in accordance with the specification, a mixed operation is also possible using devices that are only embodied for communication in accordance with the DSI3 specifications ("signal power class" or "signal function class") since these devices ignore the bus communication phases that are not accessible for said devices.

The operating method is provided for the operation of active sensor units. The term "active sensor unit" in this sense is understood to be a sensor unit that comprises a transmitter for transmitting a signal and a receiver for receiving a reflection of this signal, in other words an echo signal. In particular, the operating methods described here are provided for a sensor arrangement having active ultrasonic sensor units. These sensor units comprise both an appropriately high power requirement as well as a high volume of data.

The signal is transmitted by means of such an active sensor unit preferably during the power phase in which the sensor unit is supplied by the processing unit with a comparatively high power with the result that the operation of the transmitter may be directly supplied from the power that is supplied via the bus. However, the sensor units preferably comprise an energy storage device, in particular in the form of a capacitor, by means of which the energy that is transmitted in the power phase may be buffered until the next power phase in the sensor unit.

Information as to whether the sensor unit is to transmit a signal and where applicable further parameters that relate to the signal that is to be transmitted is preferably transmitted to the sensor unit in the mentioned CRM phase.

In accordance with the second aspect of the invention, a method is proposed that in practice is preferably realized together with the described method in accordance with the first aspect of the invention, fundamentally however said method in accordance with the second aspect may also be realized independently of said method in accordance with the first aspect. The method is applied in a sensor arrangement that comprises at least one processing unit (master) and at least one active sensor unit (slave) that are connected to one another via a bus of two lines. This method is however particularly expedient in the case of a bus having a plurality of active sensor units.

In accordance with this method, the communication between the processing unit and the at least one active sensor unit is performed using a typically repeating sequence of at least the two following part phases.

In a first phase, the processing unit and the active sensor unit communicate in a bidirectional manner in the CRM mode. In this phase, simple or repeated commands are transmitted from the processing unit to one or multiple active sensor units, wherein a release is granted by means of a command of the processing unit to the active sensor unit and by means of said release this active sensor unit receives an allocation of an additional supplementary time slot in addition to a time slot that is fixedly allocated to the active sensor unit. In the case of a sensor arrangement having at least two active sensor units, this release is allocated to one of the two active sensor units.

In a subsequent further phase in the PDCM mode, the active sensor units respectively transmit sensor data essentially in a unidirectional manner to the processing unit. In this case, any active sensor unit that previously in the CRM phase has been granted the release for a supplementary time slot transmits data to the processing unit both in the time slot that is fixedly allocated to said sensor unit as well as in the supplementary time slot that is allocated to said sensor unit.

The time slots that are defined for the transmission of data to the processing unit and that are characteristic of the transmission of data in the PDCM mode have already been previously determined by means of the processing unit and preferably transmitted during an initial phase of the transmission of data in the CRM mode to the active sensor unit. In this case, the processing unit defines more time slots than active sensor units on the bus with the result that in addition to the time slots that are fixedly allocated to an active sensor unit at least one time slot remains that may be allocated variably, therefore that may be allocated in different measuring cycles to different active sensor units. This at least one time slot that may be allocated variably may be understood as a time slot of a "virtual" sensor unit that does not really exist (virtual slave).

If during the course of the CRM phase, the additional time slot is released, this at least one time slot that may be allocated variably is allocated to one of the active sensor units, in particular by means of transmitting an identification of this time slot or of the virtual sensor unit that this time slot is allocated to. On this basis, the relevant active sensor unit may determine, with reference to the previously provided data regarding the time slots, in which additional time slot said active sensor unit is authorized to transmit.

In the simplest case, the processing unit defines only one virtual sensor unit together with a time slot that may then be allocated variably to one of the real active sensor units. However, it is also conceivable that multiple virtual sensor units are defined that then respectively comprise a time slot that may be allocated variably with the result that multiple real active sensor units may be respectively allocated an additional time slot for the same PDCM phase or multiple additional time slots may be allocated to a real active sensor unit for a PDCM phase. It is not necessary in accordance with the specification for the time slots to have uniform lengths. It is therefore by way of example also conceivable to give the time slots of the real active sensor unit and of the virtual slaves different lengths if the specific embodiment of the active sensor unit regularly leads to the fact that either a particularly small amount of data or a particularly large amount of data occurs.

An alternative possibility for the definition in accordance with the invention of additional time slots that may be allocated variably and for releasing said time slots on a case by case basis resides instead in dynamically changing the size of the time slots. This would however lead to the fact that a considerably larger quantity of data would have to be transmitted from the processing unit to the active sensor unit in order to repeatedly inform all the active sensor units regarding the changed arrangement of the time slots.

The at least one time slot that is to be allocated variably is allocated to a real active sensor unit by means of the processing unit preferably in dependence upon the parameters of the respective measuring cycle, in particular in dependence upon which active sensor unit receives a command to transmit a signal. The knowledge of which sensors are to expect an echo of such signals depends upon the configuration of the sensor network. By way of example, the arrival of two echo signals is thus to be expected at a receiver of a sensor unit if the transmitter of the two sensor units that are arranged to the left-hand side and right-hand side adjacent to this sensor unit receive the command to transmit a signal.

The arrangement of the time slots of the virtual sensor units, therefore the time slot that may be allocated in a variable and dynamic manner to a real active sensor unit preferably provides that said times slots are arranged at the end of the sequence of time slots, therefore after the time slots that are fixedly allocated to the real active sensor units. This allows for the time slots that are to be allocated variably to not be used in each measuring cycle but rather allows for said time slots that are to be allocated variably to be used on a case by case basis. The processing unit may then revert after the transmission of data to the last fixedly allocated time slot as early as in the CRM mode without it being necessary to wait for the time slot that may be allocated variably.

In addition to the described operating method, the invention also relates to a sensor arrangement, in particular an ultrasonic sensor arrangement for a motor vehicle, said arrangement comprising at least one processing unit and at least one active sensor unit that are connected to one another via a bus having two lines. The at least one active sensor unit or the preferably multiple active sensor units are respectively embodied for ascertaining the generation of an electromagnetic signal or an ultrasonic signal and also for ascertaining a corresponding echo signal.

This sensor arrangement or the processing unit and the at least one active sensor unit are embodied for the operation in accordance with at least one of the above methods.

All the bus topologies that are provided in the DSI3 standard, in other words "point to point", "daisy chain" and "parallel bus topology" may be used in this case.

An accordingly embodied driver assist system and also a motor vehicle having such a driver assist system are furthermore included in the invention.

SHORT DESCRIPTION OF THE DRAWINGS

Further advantages and aspects of the invention are apparent in the claims and the following description of preferred exemplary embodiments of the invention that are explained below with reference to the figures.

FIG. 1 illustrates a motor vehicle on which a sensor arrangement in accordance with the invention is provided.

FIG. 2 illustrates the bus communication on the bus system of the sensor arrangement in accordance with FIG. 1

DETAILED DESCRIPTION OF THE EXEMPLARY EMBODIMENTS

Figure 3A:
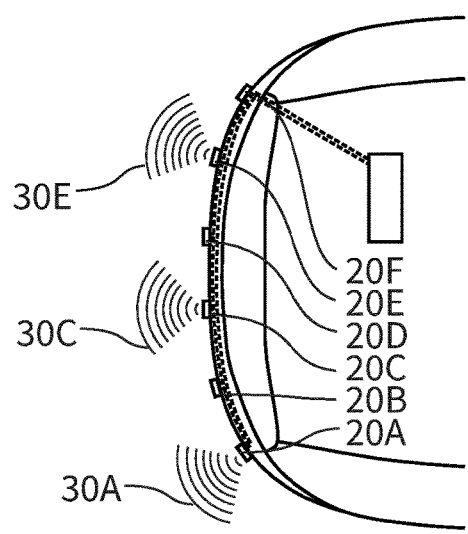
FIGS. 3A to 3C illustrate the operating principle of the sensor arrangement in a first driving situation.

FIG. 1 illustrates in a schematic view a motor vehicle 10 that comprises a driver assist system in accordance with the invention. Part of this driver assist system is a sensor arrangement 12 in accordance with the invention that in the present case is embodied in a purely exemplary manner as a sensor arrangement having sensor units on the front bumper of the motor vehicle 10.

The sensor arrangement 12 is a sensor arrangement 12 having active sensor units 20A-20F, in other words having sensor units that respectively combine a transmitter 21 and a receiver 22, as is apparent with reference to the enlarged sensor 20F in FIG. 1. The reflection of a signal that is emitted by means of the transmitter 21 may therefore be received by means of the receiver 22 of the same sensor unit or also another sensor unit in order to draw conclusions regarding the area surrounding the vehicle from the reflection. In particular, it may be sensor units 20A-20F that are fitted with an ultrasonic transmitter 21 and an ultrasonic receiver 22.

The sensor arrangement 12 comprises a control device (ECU) 14 as the central instance of the sensor arrangement A control device and the bus master in the sense of the DSI3 specification are included in said sensor arrangement. This control device 14 is connected via a two-wire bus 16 to the altogether six sensor units 20A-20F (slaves). These sensor units 20A-20F are either connected in parallel or in a so-called daisy chain arrangement to the bus 16. The possibilities of the connection are apparent from the DSI3 specification for the "distributed system interface". The outlay that is required for the cabling is particularly small due to the particularly simple bus having only two lines.

The bus 16 is operated in a particular manner that is described below in order to ensure both the supply of energy to the sensor units as well as a rapid and flexible transmission of data despite the only two lines.

FIG. 2 illustrates a section of the communication that comprises bringing the bus into operation and altogether two so-called measuring cycles. The X axis in the diagram in FIG. 2 represents the time.

A measuring cycle in this case respectively comprises the command communication from the control device 14 to the relevant sensor units 20A-20F with respect to the signals that are to be transmitted, the energy supply of the sensor units 20A-20F and the return of data from the sensor units 20A-20F to the control device.

The communication that is required for this purpose comprises three different phases per measuring cycle, said phases being described below.

The first phase 40, the so-called CRM phase (command and response) is within each measuring cycle. In this phase 40, the control device communicates in a bidirectional manner with the sensor units and transmits in this case in particular commands 41 by means of which the sensor units 20A-20F are informed which of the sensor units is to transmit an ultrasonic signal in the relevant measuring cycle. Where required, the sensor units 20A-20F transmit responses 42 in this CRM phase.

In the subsequent second phase 43, the energy is supplied to the sensor units 20A-20F via the bus 16, in particular to any sensor units that have received the command to transmit the ultrasonic signal in the first phase 40. This electrical energy is buffered in an energy storage device 23 of the sensor units 20A-20F, in particular in a capacitor 23 that is provided for this purpose.

Furthermore, while energy is transmitted via the bus 16, the relevant sensor units 20A-20F transmit the ultrasonic signal 30 mentioned in FIG. 2 by means of their respective transmitter 21 and supplied by the capacitor 23 or supplied directly via the bus 16 and depending upon the area surrounding the vehicle, said sensor units receive the echo signal of said ultrasonic signal, in other words the reflection of the signal that is transmitted and where applicable also echo signals of transmitters of the other sensor units.

The transmission of the data of this echo signal to the control device 14 follows as the third and last phase 44 of the measuring cycle. This unidirectional transmission occurs in the PDCM mode (periodic data collection mode). It is characteristic of this PDCM phase 44 that, unlike in the CRM mode, the control device does not transmit via the bus commands to which the respective relevant sensor unit then reacts. Instead, the control device 14 only transmits a synchronizing signal 45. This synchronizing signal is received by all the sensor units and is used as the reference time point.

Each sensor unit 20A-20F in the CRM mode comprises a bus identification for the clear addressing procedure. In the present case, the six sensor units 20A-20F in an exemplary manner comprise the bus identifications "1" (20A) to "6" (20F).

Based on the reference time point that is set by means of the synchronizing signal 45, the sensor units 20A-20F then determine the time slots 47 that are allocated to their respective bus identification and in said time slots the sensor units subsequently write their data blocks 46 in accordance with the PDCM mode for transmission to the control device 14 on the bus 16 with the result that said data blocks may be read by the control device 14 for further processing.

The mentioned time slots 47 in which the sensor units 20A-20F respectively exclusively transmit have been transmitted to said sensor units beforehand in the form of a type of time slot table and during the first initial CRM phase 40 as time intervals, calculated by the synchronizing signal 45. Each bus identification "1" to "6" is allocated such a time slot 47. The mentioned time slot table is preferably transmitted as the sensor arrangement 12 is brought into operation. This is also the reason why the first CRM phase 40 in FIG. 2 is illustrated as longer than the CRM phases 40 that follow said first phase. Alternatively, the time slot table may also be persistently stored in the sensor units 20A-20F.

As is apparent with reference to FIG. 2, the number of data blocks 46 and the time slots that are provided for these data blocks according to the synchronizing signal 45 is eight, although only six sensor units are really provided with the bus identifications "1" to "6". The reason for this is that the control device 14 in the initial CRM phase 40 not only allocates a time slot to these six real sensor units 20A-20F but rather also two virtual slaves that receive the bus identifications "7" and "8". Two time slots are therefore defined that are not fixedly allocated to any of the sensor units 20A-20F but rather may be allocated variably as is further explained below. The positions of these additional time slots relative to the synchronizing signal 45 are therefore also transmitted to the sensor units 20A-20F or are persistently stored in these sensor units. These time slots are arranged as the last in the chronology of the PDCM phase 44.

In the CRM phase 40, the control device 14 not only transmits to the sensor units 20A-20F which of the sensor units 20A-20F is or are provided for the transmission of the ultrasonic signal 30 but rather also which sensor unit 20A-20F is allocated in addition to its fixedly predetermined time slot an additional time slot from the two time slots 47 of the virtual slaves having the bus identifications "7" and "8". It is also possible that the additional time slots that may be allocated variably are not allocated to any of the sensor units with the result that each sensor unit 20A-20F respectively only comprises its fixedly allocated time slot.

Whether the control device 14 allocates the time slots 47 that may be allocated variably to a sensor unit depends upon the driving situation and the sensor data requirement that is provided in dependence upon the driving situation. This is explained below with reference to three examples.

Figure 3B:
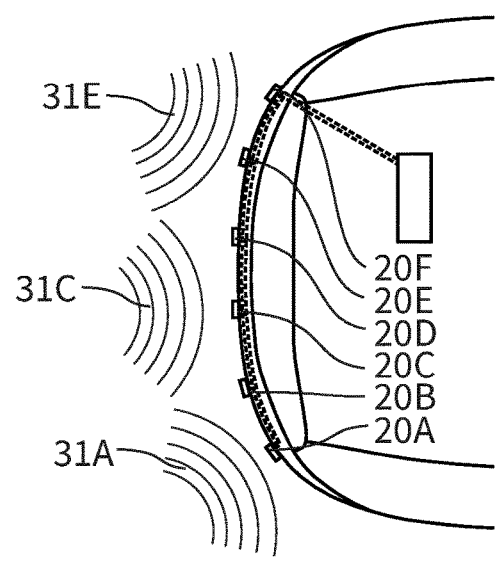
Figure 3C:
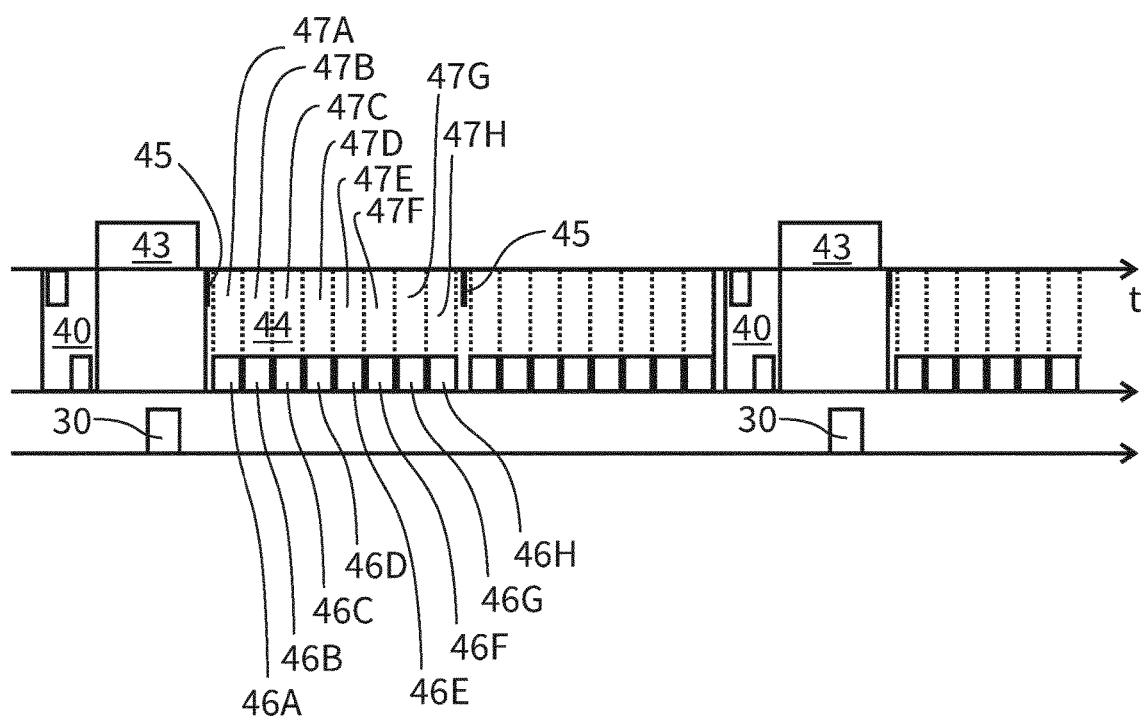

The example of FIG. 3A to 3C illustrates a situation that may occur by way of example when parking the vehicle. In this situation it is necessary to identify the surrounding area as precisely as possible in order to avoid collisions.

As illustrated in FIG. 3A, it is provided for this purpose that three of the six sensor units, namely in the present case the sensor units 20A, 20C and 20E, are to transmit a signal. With reference to FIG. 3C, a specific command is transmitted in the CRM phase 40 to the relevant sensor units. Furthermore, it may also be communicated to these sensor units 20A, 20C, 20E in this phase 40 how the signal that is to be transmitted is to be individualized, by way of example via determining a particular transmission frequency with the result that the echo signals may be later differentiated. Alternatively, it may also be provided that the sensor units 20A-20F when transmitting the signal always individualize this signal via a parameter that is dependent upon its bus identification, by way of example in that the bus identification is coded into the signal that is to be transmitted.

The control device 14 and the sensor units 20B, 20D likewise transmit the bus identification of respectively one of the two above-described virtual slaves in the CRM phase 40, in the present case therefore in an exemplary manner the "7" and "8". The two sensor units 20B, 20D learn by means of the specific commands that said sensor units respectively comprise two time slots for transmitting data to the control device 14 in the following PDCM phase, namely their fixedly predetermined allocated bus identifications ("2" or "4") and a variably allocated ("7" or "8").

After concluding the CRM phase 40, the control device increases the bus voltage in the above described manner to a value beyond the highest voltage that is customary during the transmission of data and therefore introduces the power phase 43. The sensor units consequently respectively charge their capacitors 23 and the selected sensor units 20A, 20C, 20E then respectively transmit their ultrasonic signal 30A, 30C, 30E.

It is apparent in FIG. 3B which reflected echo signals 31A, 31C, 31E are reflected by reflecting surfaces (not illustrated) in the area surrounding the vehicle. As is apparent with reference to the figure, these echo signals 31A, 31C, 31E not only arrive at the sensor units 20A, 20C, 20E that are transmitting but also arrive at the three other sensor units 20B, 20D, 20E. Two of these sensor units, namely the sensor units 20B and 20D, in this case respectively sense two echo signals owing to their arrangement.

The control device 14 introduces the transmission of data from the sensor units 20A to 20E to the control device 14 by means of the first synchronizing signal 45. Initially, all six sensor units 20A-20F in their fixedly allocated time slot 47A-47F transmit the ascertained data of a first echo signal to the control device. As soon as this has taken place, in the time slots 47G, 47H that have been additionally allocated to said sensor units for this measuring cycle, the two sensor units 20B, 20D transmit the ascertained data of the second echo signal, said data being ascertained by means of said additionally allocated time slots.

In the case of the present example, the time slots however respectively are not sufficient in order to fully transmit the ascertained data of an echo signal to the control device with the result that the control device transmits a second synchronizing signal 45, which again provides the opportunity for each sensor unit 20A-20F to transmit the remaining data in the respective time slot 47A-47F of said sensor unit. Also during this second cycle within the PDCM phase 44, the sensor units 20B, 20D in turn additionally transmit in the time slot 47G, 47H that is additionally allocated to said sensor units for this measuring cycle.

The larger transmission requirement of the sensor units 20B, 20D, which is required owing to the quantity of data, which has doubled in volume, is therefore covered via the additional time slots 47G, 47H. Despite the concept of the time slots, the larger transmission requirement only leads to a slightly increased transmission time.

Figure 4A:
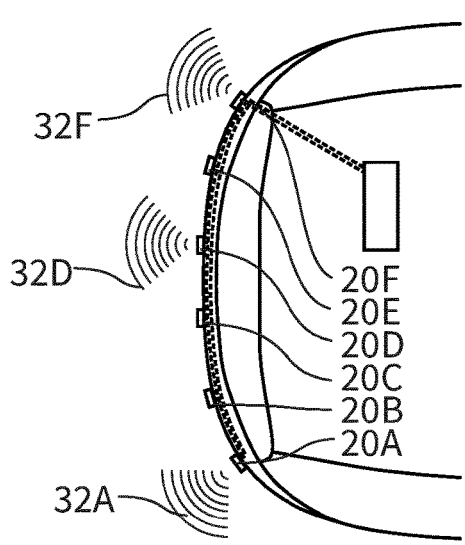
FIGS. 4A to 4C illustrate the operating principle of the sensor arrangement in a second driving situation.
Figure 4B:
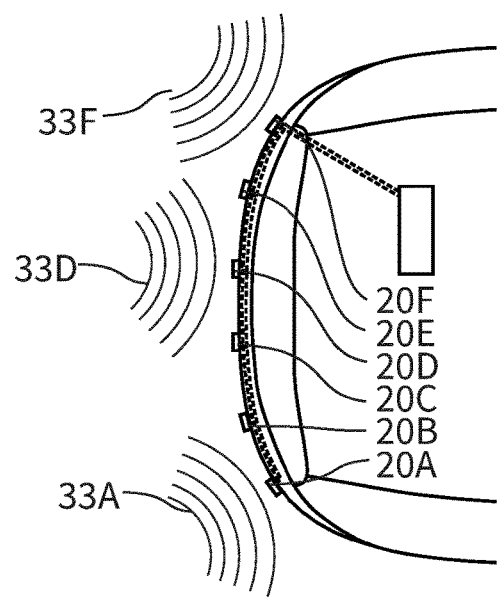
Figure 4C:
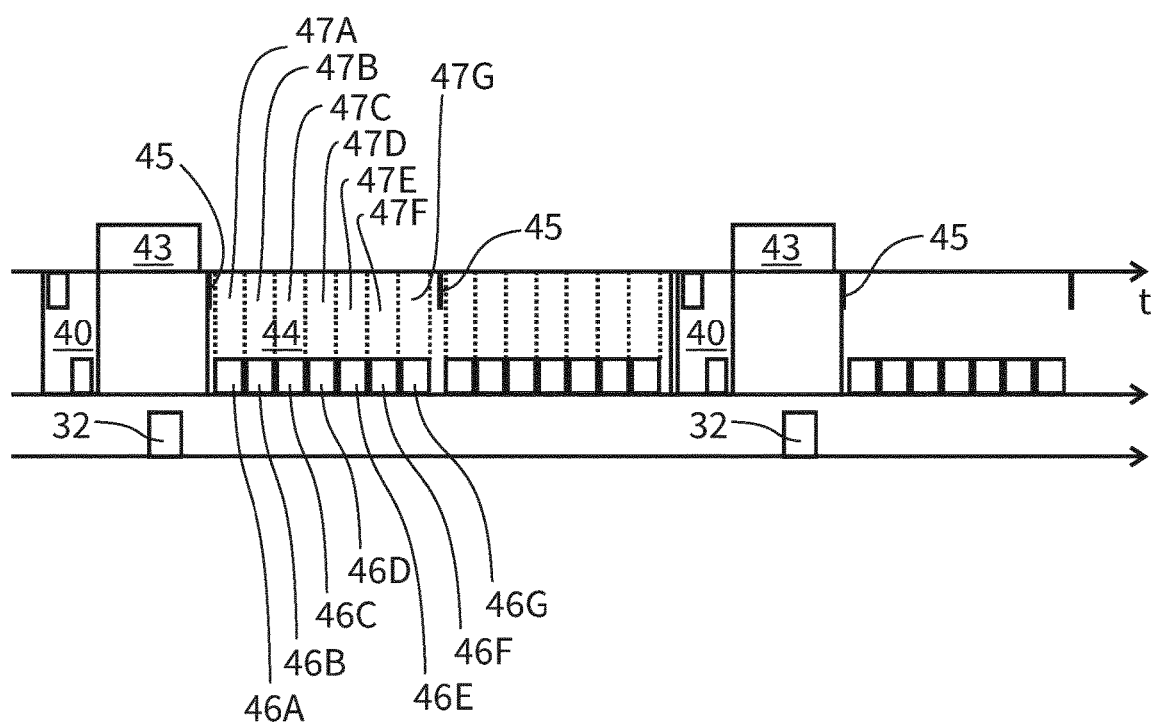

The second example of FIG. 4A to 4C represents a driving situation such as may be set in city traffic.

In order in particular to monitor the vehicles that are parked on the right-hand side in the event of driving on the right-hand side or to monitor the vehicles that are coming from the right-hand side, it is provided here that the sensor units 20D and 20F are to transmit the ultrasonic signals. Moreover, the sensor unit 20A is also to transmit an ultrasonic signal by means of which it is possible to observe the oncoming traffic.

In the CRM phase 40 therefore commands are sent from the control device 14 to these sensor units 20A, 20D 20F that said signal units are to transmit signals where applicable supplemented by parameters for the signal that is to be transmitted so that said signals may be differentiated from one another. Likewise in the CRM phase 40, a command is transmitted to the sensor 20E by means of which this sensor is allocated to the time slot 47G of one of the two virtual slaves in this case of the virtual slave having the bus identification "7".

The virtual slave having the bus identification "8" and its time slot 47H is not allocated in this second example to any of the sensor units.

Similar to the first example, in the power phase 43 the selected sensor units 20B, 20D, 20F transmit their respective ultrasonic signal 32B, 32D, 32F as is illustrated in FIG. 4A. These ultrasonic signals are in turn reflected on reflection surfaces and reach the sensor units as echo signals 33B, 33D, 33F.

However, in this second example, it is only the sensor unit 20E, which owing to the arrangement between the transmitting sensor units 20D, 20F receives two echo signals, namely the echo signals 33D, 33F.

Similar to the first example, in the PDCM phase the data is subsequently transmitted from the sensor units 20A to 20F to the control device 14, said transmission being triggered by means of the synchronizing signal 45. In turn all the sensor units 20A-20F initially transmit in their fixedly allocated time slots 47A-47F. The sensor unit 20E subsequently uses the time slot 47G that is allocated to the bus identification "7" in order to transmit the larger quantity of data with respect to the other sensor units to the control device 14.

The feature in this second example is now that it is not necessary to wait for the time slot 47H that is allocated to the bus identification "8" and that has not been allocated to the sensor units 20A to 20F. After receiving the data of the time slot 47F with the bus identification "7", the control device 14 immediately transmits the second synchronizing signal 45 since it knows that it has assigned the bus identification "8" and therefore no more data is expected.

The result of this is that the transmission of data takes place more rapidly. Despite the fact that altogether eight time slots 47A-47H have been defined for the bus identifications "1" to "8" and are available when required, the measuring cycles in this second example are only as long as would be the case in the seven time slots since it is not necessary for the control device 14 to wait for the time slot 47H of the bus identification "8" but rather said control device may continue directly.

Figure 5A:
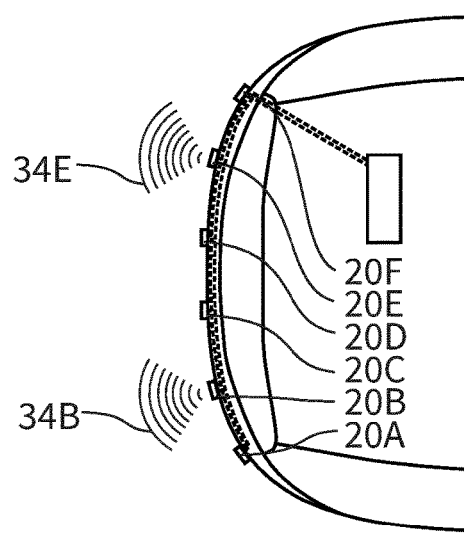
FIGS. 5A to 5C illustrate the operating principle of the sensor arrangement in a third driving situation.
Figure 5B:
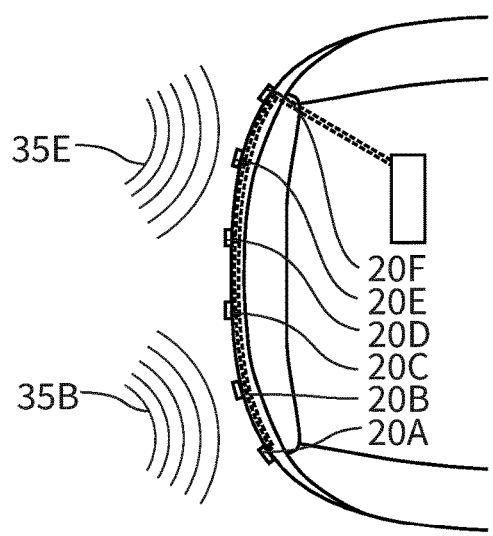
Figure 5C:
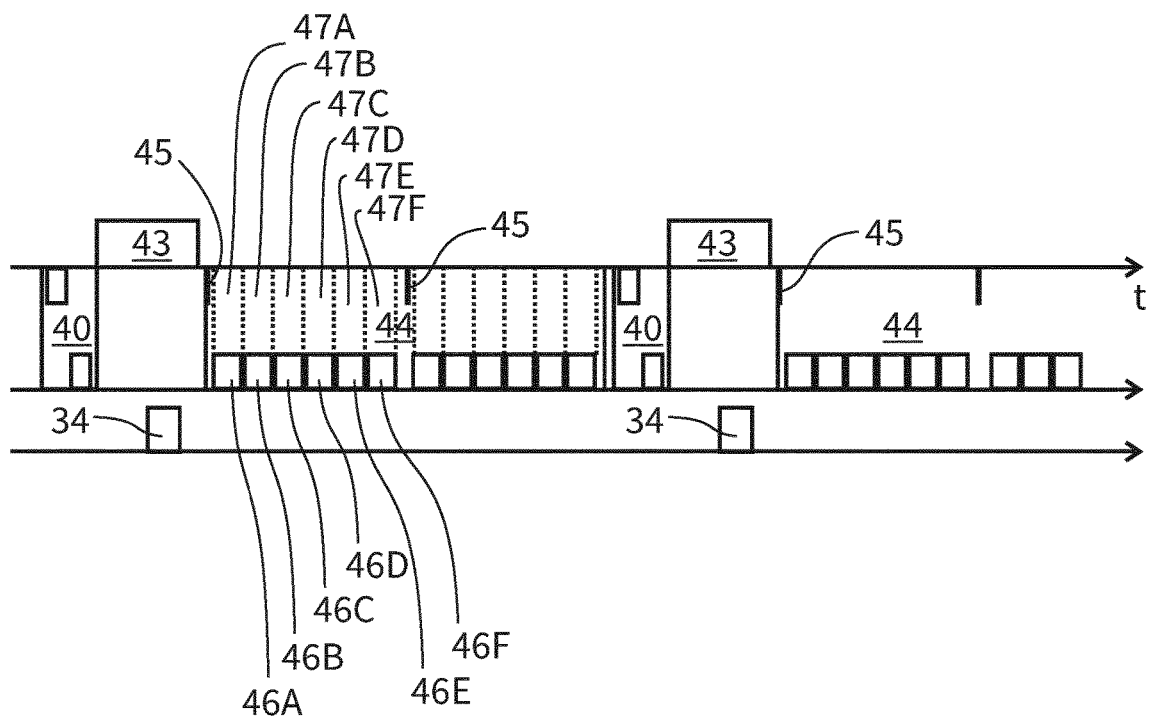

The last example of the FIGS. 5A to 5C also illustrates a similar concept. In this case, this is a driving situation as is the case by way of example on the motorway.

In the CRM phase 40 of the measuring cycle in this situation the command is sent to the two sensor units 20B, 20F, consequently these sensor units are to transmit an ultrasonic signal 34B, 34F. The time slots of the bus identifications "7" and "8" conversely are not allocated in this case.

If the signal that is transmitted from the mentioned sensor units 20B, 20F is reflected, it arrives back at the sensor units as an echo signal 35B, 35F, wherein the sensor units 20A to 20C ascertain the echo signal 36B and the sensor units 20D to 20F ascertain the echo signal 36F.

After introducing the PDCM phase 44 by means of transmitting the first synchronizing signal 45, the transmission of data by means of the sensor units 20A to 20F is introduced. All the sensor units 20A-20F transmit the ascertained data in their respective time slot 47A-47F. As soon as the last of these six time slots 47A-47F is concluded, the control device 14 transmits the second synchronizing signal 45 in order to receive the remaining data in the respective second time slots 47A-47F. The control device 14 subsequently transfers back into the CRM mode and therefore introduces the next measuring cycle.

As is also the case in the second example, the altogether eight time slots 47A to 47H therefore also do not lead in this third example to an extension of the measuring cycle provided that this is not provided by means of the quantity of data. The third example furthermore illustrates that the measuring cycle is then not extended, with respect to a conception of the sensor arrangement entirely without virtual slaves if an increased quantity of data is not available.

The shortening of the measuring cycles in accordance with the second and the third example above all has the advantage of an increased measuring frequency. Whilst in the parking situation of the first example owing to the typically slow speeds in this case a lower measuring frequency may be overcome, it is particularly advantageous in the city traffic situation of example 2 and also in the motorway situation of example 3 and owing to the increased speeds that prevail here that measuring cycles are shortened in this case and the measuring frequency is increased.

The invention claimed is:

1. A method for operating a sensor arrangement in a motor vehicle on the basis of a DSI protocol:
   wherein the sensor arrangement comprises at least one processing unit and at least one active sensor unit having a transmitter for transmitting a signal and a receiver for receiving an echo signal, the method comprising:
   communication between the processing unit and the active sensor unit occurring repeatedly in a sequence having the following part phases:
      in a command and response mode (CRM) phase, bidirectional communication takes place between the processing unit and the active sensor unit,
      in a power phase, a transmission of energy from the processing unit to the active sensor unit takes place, and
      in a periodic data collection mode (PDCM) phase, after a synchronizing signal is transmitted from the processing unit, a unidirectional transmission of data takes place from the active sensor unit to the processing unit.

2. The method according to claim 1, wherein the at least one active sensor unit is embodied as an ultrasonic sensor unit having an ultrasonic transmitter and an ultrasonic receiver.

3. The method according to claim 2, wherein the transmitter transmits the signal during the power phase and the echo signal of said signal is subsequently ascertained by the receiver.

4. The method according to claim 1, wherein the active sensor unit comprises an energy storage device for storing electrical energy, said energy storage device being charged during the power phase.

5. The method according to claim 1, wherein in the CRM phase, data is transmitted from the processing unit to the active sensor unit, said data comprising parameters for transmitting the signal and/or parameters for receiving the echo signal by the receiver.

6. The method according to claim 1, further comprising:
in the PDCM phase, simply or repeatedly transmitting a synchronizing signal, by the processing unit, which is received by the at least one active sensor unit,
wherein the active sensor units subsequently start to transmit data to the processing unit on the basis of information that is stored beforehand in the active sensor units or information that is transmitted from the processing unit regarding the relative position of time slots of one of any active sensor units; and
in the CRM phase transmitting, by the processing unit, addressed commands of 32 bit length to one of the active sensor units,
wherein the addressed active sensor unit then transmits a response of 32 bit length and/or the transmission of data from the processing unit to the active sensor units is then performed in a voltage modulated manner,
wherein Manchester coding and/or two voltage levels VLow of 2 V (+/−0.25V) and VHigh of 4 V (+/−0.5V) are used and/or the transmission of data from an active sensor unit to the processing unit is then performed in a voltage modulated manner, wherein the data is coded in current strengths of three discreet levels that are identically spaced from one another, and
in the power phase the processing unit increases the voltage $V_{Idle}$ that is prevailing at the bus to at least 6V.

7. A sensor arrangement for a motor vehicle, comprising:
at least one central instance and at least one active sensor unit that are connected to one another via a bus of two lines,
wherein each active sensor unit includes an ultrasonic transmitter and an ultrasonic receiver, and
wherein the sensor arrangement is embodied so as to operate in accordance with the method of claim 1.

8. A driver assist system for a vehicle comprising a sensor arrangement according to claim 7.

9. A vehicle comprising: a driver assist system according to claim 8, wherein the sensor arrangement is embodied as an ultrasonic sensor arrangement in the region of a bumper of the vehicle.

10. A method for operating a sensor arrangement in a motor vehicle on the basis of a DSI protocol wherein:
the sensor arrangement comprises at least one processing unit and at least two active sensor units having a transmitter for transmitting a signal and a receiver for receiving an echo signal, said transmitter and receiver being connected to one another via a bus of two lines, the method comprising:
communication between the processing unit and the active sensor units occurring repeatedly in a sequence having the following part phases:
in a command and response mode (CRM) phase, bidirectional communication takes place between the processing unit and the active sensor units, during which, in addition to a time slot that is fixedly allocated to the active sensor units, the processing unit allocates a variable supplementary time slot to one of the active sensor units by a releasing procedure, and
in a periodic data collection mode (PDCM) phase, after a synchronizing signal that is transmitted from the processing unit, a unidirectional transmission of data takes place from the at least two active sensor units to the processing unit in different time slots,
wherein any active sensor unit that previously in the CRM phase has been granted the release for a supplementary time slot transmits data to the processing unit both in the time slot that is fixedly allocated to said sensor unit as well as in the supplementary time slot that is allocated to said sensor unit.

11. The method according to claim 10, wherein:
the active sensor units are embodied as ultrasonic sensor units having an ultrasonic transmitter and an ultrasonic receiver, and
in the CRM phase at least two of the active sensor units are granted a command to transmit respectively a signal, and the supplementary time slot is allocated to one of the at least two active sensor units in dependence upon which of the active sensor units is predicted owing to the arrangement of the active sensor units to receive echo signals of the at least two signals that are transmitted.

12. The method according to claim 10, further comprising: as the sensor arrangement is brought into operation, the processing unit transmits information to the active sensor units regarding the chronological relative position of the fixedly allocated time slots of one of any active sensor units and the at least one variable supplementary time slot.

13. The method according to claim 10, further comprising: allocating the time slots in chronological relative positions in a sequence, said relative positions being arranged according to the fixedly allocated time slots chronologically prior to the supplementary time slots that are variably allocated.

14. The method according to claim 10, further comprising: allocating the additional time slot to one of the active sensor units by transmitting an identification that is not assigned to a real active sensor unit.

* * * * *